(12) United States Patent
Fabis et al.

(10) Patent No.: US 7,056,611 B2
(45) Date of Patent: Jun. 6, 2006

(54) SYSTEM FOR CONTROLLING THE OPERATING TEMPERATURE OF A FUEL CELL

(75) Inventors: Thomas R. Fabis, Delmont, PA (US); Joseph M. Makiel, Monroeville, PA (US); Stephen E. Veyo, Murrysville, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 371 days.

(21) Appl. No.: 10/196,319

(22) Filed: Jul. 16, 2002

(65) Prior Publication Data

US 2004/0013913 A1   Jan. 22, 2004

(51) Int. Cl.
*H01M 8/04* (2006.01)
(52) U.S. Cl. .......................................... 429/24; 429/26
(58) Field of Classification Search .................. 429/13, 429/22, 24, 26
See application file for complete search history.

(56) References Cited

U.S. PATENT DOCUMENTS

| | | | |
|---|---|---|---|
| 4,859,545 A * | 8/1989 | Scheffler et al. ............... | 429/17 |
| 6,136,462 A | 10/2000 | Kriechbaum et al. | |
| 6,186,254 B1 | 2/2001 | Mufford et al. | |
| 6,306,531 B1 | 10/2001 | Clingerman et al. | |
| 6,368,737 B1 * | 4/2002 | Margiott et al. ............... | 429/26 |
| 6,461,751 B1 * | 10/2002 | Boehm et al. .................. | 429/13 |
| 2002/0168556 A1 * | 11/2002 | Leboe et al. .................. | 429/13 |

FOREIGN PATENT DOCUMENTS

JP    07-161371 A  *  6/1995

OTHER PUBLICATIONS

IPDL JPO Machine Translation for JP 07-161371 A (publication date of Jun. 1995).*

* cited by examiner

*Primary Examiner*—Susy Tsang-Foster

(57) ABSTRACT

A method and system are provided for improved control of the operating temperature of a fuel cell (32) utilizing an improved temperature control system (30) that varies the flow rate of inlet air entering the fuel cell (32) in response to changes in the operating temperature of the fuel cell (32). Consistent with the invention an improved temperature control system (30) is provided that includes a controller (37) that receives an indication of the temperature of the inlet air from a temperature sensor (39) and varies the heat output by at least one heat source (34, 36) to maintain the temperature of the inlet air at a set-point $T_{inset}$. The controller (37) also receives an indication of the operating temperature of the fuel cell (32) and varies the flow output by an adjustable air mover (33), within a predetermined range around a set-point $F_{set}$, in order to maintain the operating temperature of the fuel cell (32) at a set-point $T_{opset}$.

6 Claims, 2 Drawing Sheets

SYSTEM FOR CONTROLLING THE OPERATING TEMPERATURE OF A FUEL CELL

The U.S. Government has rights in this invention under contract number DE-FC26-97FT34139 awarded by the Department of Energy.

FIELD OF THE INVENTION

The present invention relates to temperature control systems, and more particularly to methods and systems for controlling the operating temperature of a fuel cell in a power generation system.

BACKGROUND OF THE INVENTION

Fuel cells are electrochemical devices that convert the chemical energy in fuel directly into electricity. Unlike many devices for generating electricity, fuel cells do not require combustion. This enables fuel cells to operate at relatively high efficiencies and to produce relatively low emissions, making them an attractive source of electrical energy.

FIG. 1 illustrates a conventional fuel cell power generator 5. The fuel cell power generator 5 includes a tubular fuel cell 10, which is illustrated in greater detail in FIG. 2. Although a tubular fuel cell is illustrated, it is well-known in the art that fuel cells may be formed in many different shapes and configurations. The fuel cell 10 illustrated in FIG. 2 includes an air electrode 12 on the inner circumference of the fuel cell 10 and a fuel electrode 14 on the outer circumference of the fuel cell 10. The air electrode 12 and the fuel electrode 14 are separated by an electrolyte 16.

Electricity is generated in the fuel cell 10 in a catalytic reaction when input air passes over the air electrode 12 and input fuel passes over the fuel electrode 14. The catalytic reaction produces ions in the air electrode 12 and the fuel electrode 14. These ions move through the electrolyte 16 toward the oppositely charged electrode, producing electricity and certain by-products such as water and $CO_2$. Once produced, the electricity may be transferred to an external circuit to serve an electric load.

The specific chemical reactions that occur in a fuel cell depend on the input fuel and the electrolyte utilized by the fuel cell. The most common types of fuel cells are phosphoric-acid fuel cells, molten-carbonate fuel cells, proton-exchange-membrane fuel cells, and solid-oxide fuel cells. In a solid-oxide fuel cell, for example, which utilizes a ceramic-solid-phase electrolyte, hydrogen or carbon monoxide in the fuel reacts with oxide ions ($O^=$) from the electrolyte to produce water or $CO_2$ and also to deposit electrons in the anode:

Anode Reaction

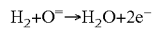

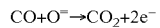

Cathode Reaction

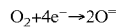

The chemical reactions in a fuel cell, and the performance characteristics of a fuel cell, are very sensitive to changes in the operating temperature of the fuel cell. To achieve adequate ionic conductivity in a solid-oxide fuel cell, for example, the fuel cell must operate between about 800° C. and 1200° C., and preferably at about 1000° C. If the operating temperature of the fuel cell drops by 10 percent, the fuel cell's performance may drop by 12 percent. Thus, it is very important to maintain a stable operating temperature in a fuel cell power generator. A problem exists, however, in that conventional fuel-cell-temperature-control systems permit significant overshoots and/or under-swings in the operating temperature of a fuel cell.

FIG. 3 illustrates a conventional-fuel-cell-temperature-control system 20. The temperature-control system 20 includes a fuel cell 22, an air mover 23, a heat exchanger 24, a bypass valve 25, a heater 26, and a controller 27. The conventional temperature-control system 20 operates to stabilize the operating temperature of the fuel cell 22 by varying the amount of heat that is added to the inlet air by the heat exchanger 24 and the heater 26.

As changing conditions in and around the fuel cell 22 cause the actual operating temperature of the fuel cell 22 to deviate from the desired temperature set-point, the controller 27 attempts to bring the operating temperature back to the desired temperature set-point by varying the amount of heat added to the inlet-air stream by the heat exchanger 24 and the heater 26. However, because the thermal diffusivity (i.e., the ratio of thermal conductivity to mass density) of the fuel cell is low, the fuel cell system has a high thermal inertia. This makes it difficult for the conventional-temperature-control system to accurately maintain the operating temperature of the fuel cell by merely adjusting the amount of heat added to the inlet air stream. As a result, the conventional-temperature-control system 20 often permits significant overshoots and/or under-swings in the operating temperature of the fuel cell 22.

SUMMARY OF THE INVENTION

With the above in mind, methods and systems consistent with the present invention provide improved control of the operating temperature of a fuel cell by varying the flow rate of the inlet air stream to the fuel cell, within a predetermined range of a flow rate set-point, in response to changes in the actual operating temperature of the fuel cell.

A method consistent with the present invention is provided for controlling the operating temperature of a fuel cell in a power generation system. The method comprises the steps of (a) modeling the power generation system to determine a desired inlet air temperature set-point ($T_{inset}$), a desired inlet air flow rate set-point ($F_{set}$), and a desired fuel cell operating temperature set-point ($T_{opset}$); (b) sensing the temperature of inlet air entering the fuel cell; (c) sensing the operating temperature of the fuel cell; (d) varying heat output by at least one heat source in response to changes in the inlet air temperature to maintain the inlet air temperature at the set-point $T_{inset}$; and (e) varying flow output by an adjustable air mover, within a predetermined range around the set-point $F_{set}$, to maintain the operating temperature of the fuel cell at the set-point $T_{opset}$.

A system consistent with the present invention is also provided for controlling the operating temperature of a fuel cell. The system comprises (a) at least one heat source for adding heat to inlet air entering the fuel cell; (b) an adjustable air mover for providing an adjustable rate of inlet air flow to the fuel cell; (c) an inlet air temperature sensor for sensing the inlet air temperature of air entering the fuel cell; (d) an operating temperature sensor for sensing the operating temperature of the fuel cell; and (e) at least one controller connected to the inlet air temperature sensor and the heat source for adjusting the heat output by the heat source to maintain the inlet air temperature at a desired inlet air temperature set-point ($T_{inset}$), and connected to the operating temperature sensor and the adjustable blower for adjusting the inlet air flow rate, within a predetermined range around an inlet air flow set-point ($F_{set}$), to maintain the operating temperature of the fuel cell at a desired temperature set-point ($T_{opset}$).

DETAILED DESCRIPTION

Figure 1:
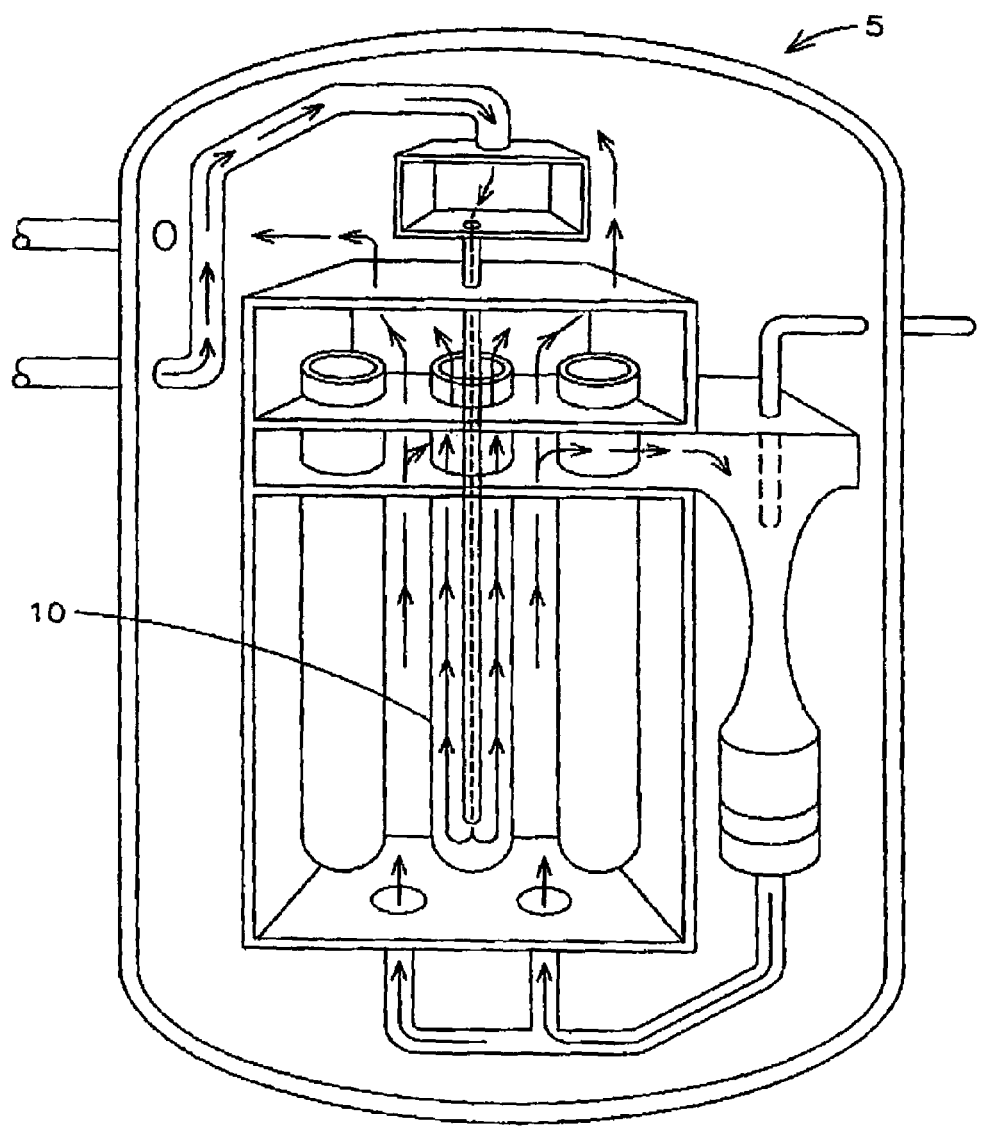
FIG. 1 illustrates a conventional fuel cell power generator.
Figure 2:
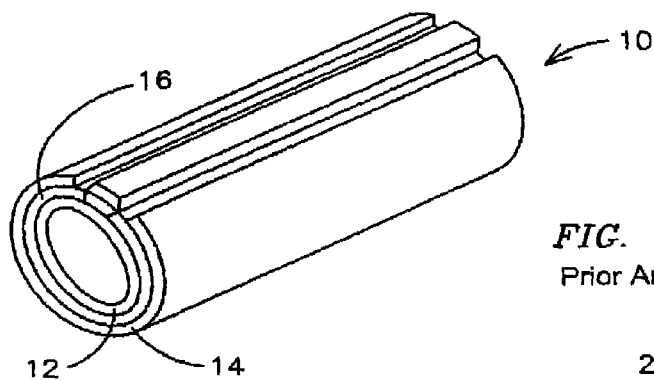
FIG. 2 illustrates a conventional tubular fuel cell.
Figure 3:
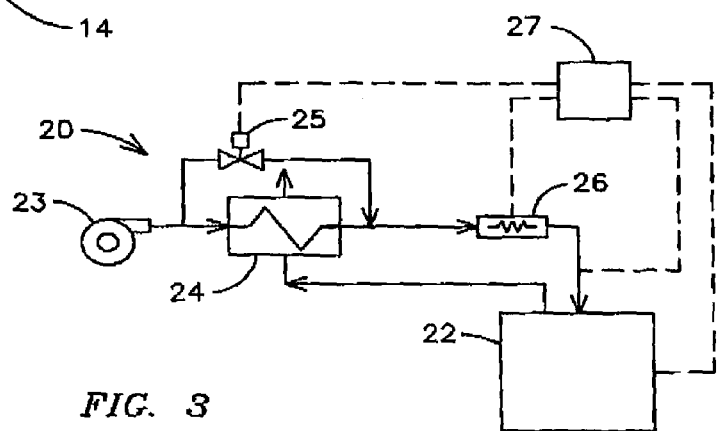
FIG. 3 illustrates a conventional fuel-cell-temperature-control system.

To facilitate the description of an exemplary embodiment of the present invention, additional description will first be given of a conventional-fuel-cell-temperature-control system. FIG. 3 illustrates a conventional-fuel-cell-temperature-control system 20. As illustrated, inlet air originates at an air mover 23. The inlet air then passes through a heat exchanger 24 and/or bypass valve 25 and a heater 26.

The heat exchanger 24 receives hot exhaust gases from the fuel cell 22 and transfers heat from these hot exhaust gases to the inlet air. The bypass valve 25 is included in parallel with the heat exchanger 24 to bypass a variable amount of inlet air around the heat exchanger 24 and thus vary the amount of heat added to the inlet air stream by the heat exchanger 24. After leaving the heat exchanger 24 and/or bypass valve 25, inlet air passes through an adjustable heater 26, which may be any heater capable of adding a variable amount of heat to the inlet air, such as an electrical heater or a fuel-based heater.

The controller 27 controls the components described above. The controller 27 attempts to stabilize the actual operating temperature of the fuel cell 22 at a desired set-point by controlling the temperature of the inlet air entering the fuel cell 22. The controller 27 controls the temperature of the inlet air entering the fuel cell 22 by providing control signals to the bypass valve 25 and the heater 26, in response to feedback signals indicative of the actual operating temperature of the fuel cell and of the actual temperature of the inlet air from temperature sensors, so as to vary the total amount of heat added to the inlet air.

Exemplary Embodiment

Figure 4:
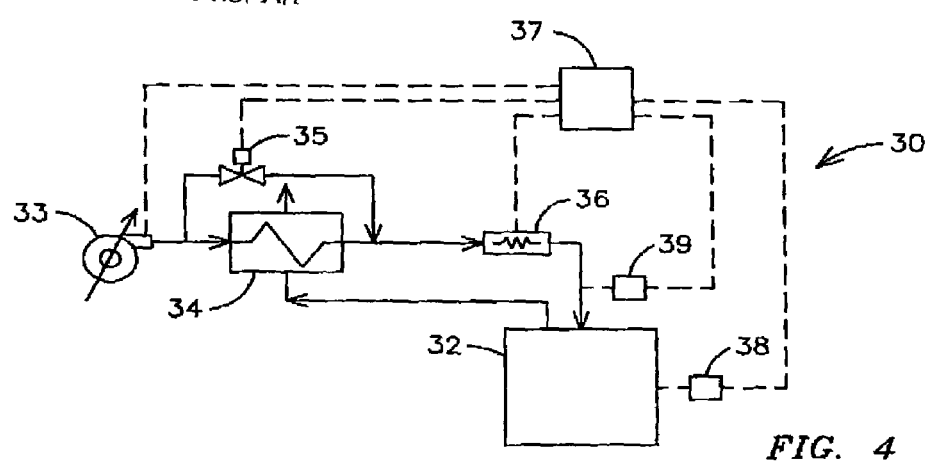
FIG. 4 illustrates a temperature-control system consistent with an exemplary embodiment of the present invention.

FIG. 4 illustrates an improved-temperature-control system 30 consistent with the present invention. The improved-temperature-control system 30 includes an adjustable air mover 33, a heat exchanger 34 (also referred to as a recuperator), a bypass valve 35, an adjustable heater 36, a controller 37, and temperature sensors 38, 39.

The adjustable air mover 33 may be any device suitable for providing inlet air to the fuel cell at a variable rate, within a predetermined range. Examples of such devices include adjustable blowers, fans, and pumps. The adjustable air mover 33 may also be the compressor of a gas turbine generator (or a microgas turbine generator), in which case the fuel cell inlet air may either be delivered by the compressor or by the discharge of the gas turbine. In either case, the gas turbine shaft speed, and thus the air delivery rate, can be varied by varying the amount of electrical power extracted from the generator of the gas turbine.

The recuperator 34 may be any heat exchanger suitable for transferring heat to the inlet air from the hot exhaust gases of the fuel cell 32. The heater 36 may be any adjustable heat source suitable for adding a variable amount of heat to the inlet air of the fuel cell 32, including electric heaters and fuel-based heaters. The controller 37 may be any controlling device suitable for providing control signals for controlling the adjustable air mover 33, the bypass valve 35, and the heater 36, in response to feedback signals from one or more sensors or transducers. An example of a controller suitable for use with the present invention is the Simatic™ 545 programmable logic controller (PLC), with built in proportional integral differential (PID) control. Other examples include general purpose industrial controllers and computers. The functions described below of the controller 37 may be performed by one controller or they may be distributed among several controllers.

The temperature sensors 38, 39 may be any of an number of temperature sensors or transducers suitable for providing feedback signals to the controller 37 indicative of temperature. As illustrated in FIG. 4, the feedback signals from temperature sensor 38 and 39 provide the controller 27 with an indication of the actual operating temperature of the fuel cell and of the actual temperature of the inlet air, respectively.

Operation of the Exemplary Embodiment

The improved-temperature-control system 30 varies the flow rate of inlet air delivered by the adjustable air mover 33, in response to changes in the actual operating temperature of the fuel cell 32. It will be clear to one of skill in the art that many different feedback and control signal configurations are possible without departing from the essence of the present invention.

As illustrated in FIG. 4, inlet air for the fuel cell originates at the adjustable air mover 33. The flow rate of the inlet air produced by the adjustable air mover 33 is varied by the controller 37, within a predetermined range of an inlet-air-flow-rate set-point ($F_{set}$), to maintain the actual operating temperature of the fuel cell at a desired-operating-temperature set-point ($T_{opset}$). This predetermined range (also referred to as a predetermined bounding modulation band) may vary depending upon the type of fuel cell involved. For example, for a particular solid oxide fuel cell, it was determined that the flow rate of the inlet air produced by the adjustable air mover 33 could be varied by plus or minus 10 percent of $F_{set}$, without adversely affecting the efficiency of the fuel cell.

Inlet air from the adjustable air mover 33 then passes through a heat exchanger 34 and/or bypass valve 35 and a heater 36. The heat exchanger 34 receives hot exhaust gases from the fuel cell 32 and transfers heat from these hot exhaust gases to the inlet air. The bypass valve 35 is included in parallel with the heat exchanger 34 to bypass a variable amount of inlet air around the heat exchanger 34 and thus vary the amount of heat added to the inlet air stream by the heat exchanger 34. After leaving the heat exchanger 34 and/or bypass valve 35, inlet air passes through an adjustable heater 36, such as an electrical heater or a fuel-based heater, that is capable of adding a variable amount of heat to the inlet air. The amount of heat added to the inlet air by the heat sources 34, 36 is controlled by the controller 37 to maintain the actual inlet air temperature entering the fuel cell at a desired-inlet-air-temperature set-point ($T_{inset}$).

As conditions in and around the fuel cell power generator change, the controller 37 of the improved-temperature-control system 30 varies the amount of heat added to the inlet air by the heat sources 34, 36. The controller 37 also varies the output flow rate of the adjustable air mover 33, within a predetermined range of $F_{set}$, in order to maintain the actual operating temperature of the fuel cell 32 at $T_{opset}$.

The values of $T_{opset}$, $T_{inset}$, and $F_{set}$ may be calculated using well-known principles of system modeling. Such modeling is typically accomplished with the aid of a computer system or computer processor. The computer system or computer processor may be either external to or integral to the controller 37. As an example, $T_{inset}$ may be calculated by modeling the fuel-cell-power-generation system with a polynomial expression such as $T_{inset} = A_0 \times I^2 + A_1 \times I + A_2$, where I is the electric current in amperes produced by the fuel cell and $A_0$, $A_1$, and $A_2$ are experimentally or analytically determined constants. Various models, however, of more or less sophistication may be used to calculate $T_{opset}$, $T_{inset}$, and $F_{set}$, depending on the desired operating characteristics. After the model of the fuel-cell-power-generation system has provided the desired values for the set-points $T_{opset}$, $T_{inset}$, and $F_{set}$, the controller 37 may be programmed and tuned accordingly.

Although the above description is presented in the context of a solid-oxide fuel cell, it will be clear to one of skill in the art that the invention may be applied to other types of fuel cells and to other types of systems that require a stable operating temperature. Thus, the scope of the invention should be determined with reference to the appended claims and their legal equivalents, rather than the specific examples given.

What is claimed is:

1. A system for controlling an operating temperature of a fuel cell, comprising:
   at least one heat source for adding indirect heat to inlet air entering the fuel cell;
   an adjustable air mover for providing an adjustable rate of inlet air flow to the fuel cell;
   an inlet air temperature sensor for sensing the inlet air temperature air entering the fuel cell;
   an operating temperature sensor for sensing the operating temperature of the fuel cell; and
   at least one controller connected to the inlet air temperature sensor and the heat source for adjusting the heat output by the heat source to maintain the inlet air temperature at a desired inlet air temperature set-point ($T_{inset}$), and connected to the operating temperature sensor and the adjustable air mover for adjusting the inlet air flow rate, within a predetermined range around an inlet air flow set-point ($F_{set}$), in response to changes in the operating temperature of the fuel cell to maintain the operating temperature of the fuel cell at a desired temperature set-point ($T_{opset}$);
   wherein the efficiency of said fuel cell is not adversely affected by the adjusting the inlet air flow rate.

2. The system of claim 1, wherein the adjustable aft mover comprises an adjustable fan.

3. The system of claim 1, further comprising a flow sensor for sensing the flow rate of the inlet air and providing an indication of the flow rate to the controller.

4. The system of claim 1, wherein the adjustable air mover comprises a compressor of a gas turbine generator.

5. The system of claim 1, further comprising a flow sensor for providing an indication to the controller of air flow output by the air mover.

6. The system of claim 1, further comprising a speed sensor for providing an indirect indication to the controller of air flow output by the air mover.

* * * * *